(No Model.)

C. P. WELTER.
LISTER CULTIVATOR.

No. 580,811. Patented Apr. 13, 1897.

WITNESSES:
M. A. Blondell
Jos. A. Ryan

INVENTOR
C. P. Welter.
BY Munn & Co.
ATTORNEYS.

UNITED STATES PATENT OFFICE.

CORNEALIOUS PETER WELTER, OF PERRY, KANSAS.

LISTER-CULTIVATOR.

SPECIFICATION forming part of Letters Patent No. 580,811, dated April 13, 1897.

Application filed August 21, 1896. Serial No. 603,487. (No model.)

*To all whom it may concern:*

Be it known that I, CORNEALIOUS PETER WELTER, a citizen of the United States, residing at Perry, in the county of Jefferson and State of Kansas, have invented certain new and useful Improvements in Lister-Cultivators, of which the following specification contains a full, clear, and exact description, reference being had to the accompanying drawings, in which—

Figure 1:
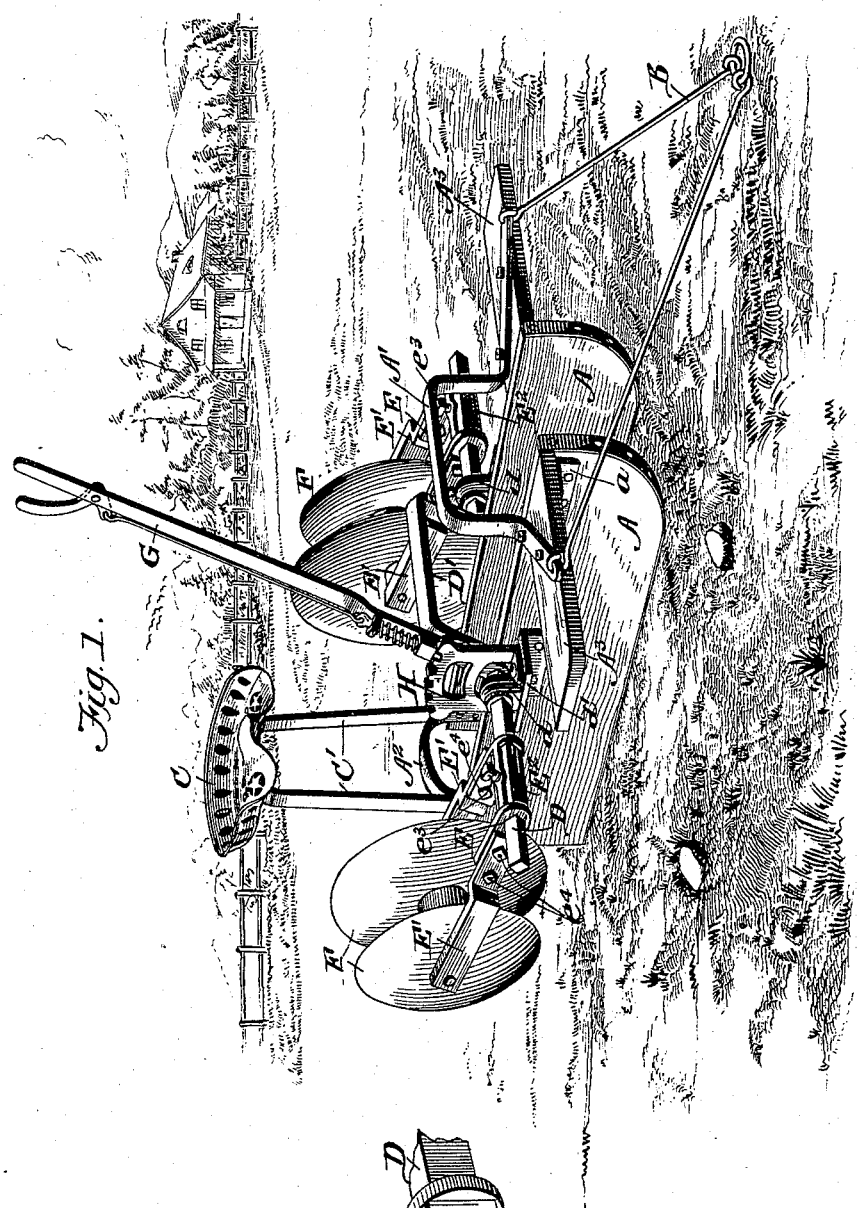
Figure 2:
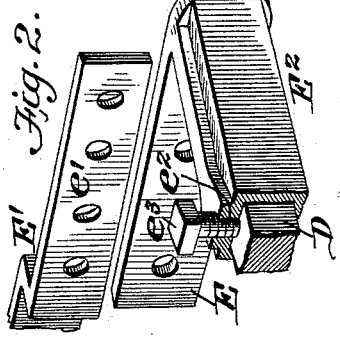

Figure 1 is a perspective view of my improved cultivator, and Fig. 2 is a detail view of one adjustable disk-carrier with its parts separated.

My invention relates to lister-cultivators which are adapted to straddle the rows of growing plants and cultivate the soil at both sides thereof.

The objects of the invention are to provide a cultivator of this class which shall be durable, simple, and inexpensive and in which the cultivator-blades at opposite sides of the runners may be simultaneously raised or lowered; also, to provide means for adjusting the cultivator-blades toward and from the shaft which carries them.

The invention will first be described, and then specifically pointed out in the claims.

The frame of the cultivator comprises the two parallel runners A A, connected at the front and rear ends of their upper edges by means of the arched bars $A'$ $A^2$. The front ends of the runners A A are provided with outwardly-projecting bars $A^3$, secured thereto by angle-irons $a$ $a$, and to the upper sides of these bars the feet of the arched bar $A'$ are bolted, the front ends of these feet being provided with apertures to which the rear ends of the V-shaped draft-rod B are secured.

C is the seat, supported above and between the rear ends of the runners by means of the vertical standard $C'$.

D is a transverse rock-shaft provided at its middle with a crank or arch $D'$, which spans the space between the runners, so as to avoid striking the growing plants. This shaft D is journaled in boxes or bearings $d$, secured to the outer sides of the runners between their ends, the bearings being preferably supported on the horizontal members of the angle-brackets $d'$. Beyond the bearings $d$ the shaft is angular, and on these angular ends are mounted the sliding cultivator-blade carriers E, each consisting in the rearwardly-extending longitudinally-extensible arms $E'$ $E'$, connected by means of a sleeve or tubular cross-piece $E^2$, having threaded aperture $e^2$, provided with a set-screw $e^3$ to engage the shaft and hold the carrier firmly in its adjusted position. By loosening these set-screws the carriers may be moved toward and from the runners, so as to bring the cultivator-blades into proper position for rows of different widths.

The rear ends $e'$ of the side arms are provided with a plurality of bolt-holes to register with similar bolt-holes in the front sections and receive the bolts $e^4$, whereby the side arms may be lengthened or shortened to adjust the blades away from or toward the shaft, according to the depth of the furrows between the rows. In the rear ends of each pair of arms is journaled a pair of disk cultivator-blades F, the inner disk of each pair being of greater diameter than the outer disk, so as to operate in the bottom of the furrows while the smaller blade is cultivating alongside of the row or side of the furrow.

The shaft D is rocked to raise and lower the cultivator-blades by means of a hand-lever G, secured at its lower end to the shaft and extending upwardly within reach of the driver. This lever G is locked in its adjusted position by means of a hand-operated latch which engages the toothed segment H, secured to one of the runners.

It will be seen that the cultivator blades or disks may be adjusted up or down to suit the depth of the furrows; also, be adjusted toward and from the rock-shaft by means of the section-arms which carry them, and also adjusted toward and from the runners, so that they have every adjustment that the work may require.

The disks may be readily removed for sharpening and repair.

Having thus described my invention, what I claim as new, and desire to secure by Letters Patent, is—

1. The combination with the connected runners, of the transverse cranked rock-shaft mounted thereon and having an operating-lever, a sleeve $E^2$ on each end of the shaft and provided with a threaded aperture and a set-screw therefor, two rearwardly-extending blade-carriers secured to each sleeve, each carrier being formed in two sections provided with a plurality of bolt-holes, whereby the blade-carriers are rendered extensible, and cultivator-blades on the rear ends of the carriers, as and for the purpose set forth.

2. A cultivator, comprising parallel runners connected by arched bars, the transverse rock-shaft cranked at its middle where it crosses the space between the runners and provided with an operating-lever and locking mechanism therefor, and the rearwardly-extending cultivator-blade carriers carrying two disks at their rear ends and connected by a sleeve adjustable longitudinally on said shaft, said carriers being formed in two sections having a plurality of holes arranged to receive a bolt and by which they are shortened or lengthened, as and for the purpose set forth.

CORNEALIOUS PETER WELTER.

Witnesses:
JOHN LEWIS,
CHARLS WIBURG.